United States Patent
Hashima et al.

(10) Patent No.: US 7,528,833 B2
(45) Date of Patent: May 5, 2009

(54) THREE-DIMENSIONAL DATA CONTROLLER AND THREE-DIMENSIONAL DATA PROCESSOR

(75) Inventors: Masayoshi Hashima, Kawasaki (JP); Yuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 11/290,991

(22) Filed: Dec. 1, 2005

(65) Prior Publication Data
US 2006/0221075 A1    Oct. 5, 2006

(30) Foreign Application Priority Data
Mar. 30, 2005    (JP)    ............... 2005-098567

(51) Int. Cl.
*G06T 15/00* (2006.01)
(52) U.S. Cl. ............ 345/424; 345/440; 345/441; 382/203; 382/205
(58) Field of Classification Search ........... 345/424, 345/421, 419, 440, 441; 382/192, 203, 205
See application file for complete search history.

(56) References Cited

U.S. PATENT DOCUMENTS

| 5,123,084 | A | * | 6/1992 | Prevost et al. ............... 345/420 |
| 6,407,738 | B1 |   | 6/2002 | Wakabayashi |

FOREIGN PATENT DOCUMENTS

| EP | 1 431 919 | 6/2004 |
| JP | 63-155366 | 6/1988 |
| JP | 8-193912 | 7/1996 |
| JP | 2000-182081 | 6/2000 |
| WO | 2005/104036 | 11/2005 |

OTHER PUBLICATIONS

Meagher, "Efficient Synthetic Image Generation of Arbitrary 3-D Objects", 1982, IEEE, pp. 473-478.*
Jackins et al., "Oct-Trees and Their Use in Representing Three-Dimensional Objects", 1980, Computer Graphics and Image Processing 14, pp. 249-270.*
W. Cochran et al., "Fractal Volume Compression", IEEE Transactions on Visualization and Computer Graphics, vol. 2, No. 4 (Dec. 1996), pp. 313-322.
E. Parker et al., "Exploiting Self-Similarity in Geometry . . . Solid Modeling", Solid Modeling 2003 ACM Conference (Jun. 2003), pp. 157-166.
M. Botsch, et al., "Efficient High Quality Rendering . . . Sampled Geometry", Rendering Techniques (Jun. 2002), pp. 53-64.
I. Boada, et al., "An Octree Isosurface . . . Discrete Planes", Proceedings of the 17th Spring Conference on Computer Graphics (2001) pp. 130-137.

* cited by examiner

*Primary Examiner*—Phu K Nguyen
(74) *Attorney, Agent, or Firm*—Staas & Halsey LLP

(57) ABSTRACT

A three-dimensional data controller controls voxel data by distributing the voxel data to hierarchical nodes. The three-dimensional data controller stores combination patterns, each representing combinations of model statuses of lower nodes towards an upper node of the hierarchical nodes, and converts, based on the combination patterns stored, the voxel data into voxel-pattern-data.

6 Claims, 8 Drawing Sheets

L L L L L L L 1     L 6 9 M 6 L 8 1     N N N N N N N

NOTE)

| COMBINATION PATTERN | SORTING NUMBER |
|---|---|
| 00000000 | → 1 |
| 00000001 | → 2 |
| 00000002 | → 3 |
| 00000101 | → 4 |
| 00000201 | → 5 |
| ...... | ... |
| 22222222 | → N |

FILL NUMBERS

| COMBINATION PATTERN (SINGLE HIERARCHY) | SORTING NUMBER | ADDRESS OF PATTERNED NODE |
|---|---|---|
| 00000000 | 1 | XXXX1 |
| 00000001 | 2 | XXXX2 |
| 00000002 | 3 | XXXX3 |
| 00000101 | 4 | XXXX4 |
| 00000201 | 5 | XXXX5 |
| ⋮ | ⋮ | ⋮ |
| NNNNNNNN | $N(\leqq 3^8)$ | XXXXN |

FIG.8

| COMBINATION PATTERN (DOUBLE HIERARCHY) | SORTING NUMBER | ADDRESS OF PATTERNED NODE |
|---|---|---|
| LLLLLLL1 | 1 | XXX1X |
| ⋮ | ⋮ | ⋮ |
| L69M6L81 | P | XXXPX |
| ⋮ | ⋮ | ⋮ |
| NNNNNNNN | $Z(\leq M^8)$ | XXXZX |

NOTE)  L=N+1
       M=N+2

THREE-DIMENSIONAL DATA CONTROLLER AND THREE-DIMENSIONAL DATA PROCESSOR

BACKGROUND OF THE INVENTION

1. Field of the Invention

The present invention relates a technology for controlling voxel data generated from three dimensional data.

2. Description of the Related Art

Conventionally, three dimensional models are converted into a voxel format so that the three dimensional models can be controlled and processed. Examples of the three dimensional models are a three dimensional polygon model created by means of three dimensional computer aided design (CAD), finite element data that is output by using an analysis simulator, and three dimensional volume data that is measured in a computed tomography (CT) scan.

Generally, a large amount of memory is required to represent such three dimensional models in the voxel format. For example, voxel data of a CT scan having a size of 512×512×512 includes approximately 100 million voxels, and each voxel includes a physical quantity and data such as coordinates, contiguous relations etc. Thus, the total amount of memory typically exceeds 1 gigabyte (GB). Accordingly, such large voxel data cannot be processed with commonly used data processors such as a personal computer (PC).

However, three dimensional models are now used in a larger scale because application of three dimensional models has expanded from a part of a product to the entire product. Accordingly, there is a need to efficiently reduce the number of voxels.

Japanese Patent Laid-Open Publication No. 2000-182081 discloses a three-dimensional data controller that controls voxel data, which is generated by subjecting three dimensional data to a voxel splitting process, by distributing the voxel data to hierarchical nodes.

To be specific, the entire space of the three dimensional data is treated as a root node, and the root node is split into eight hierarchical nodes. If a three dimensional model is included in a split area, the three-dimensional data controller carries out a voxel splitting process to further split the split area into eight parts. The voxel splitting process is recursively carried out until a three dimensional model is not included in the split area, or only a surface part of the three dimensional model is included in the split area, or the voxel data is split into hierarchies of predetermined depth.

As a result, an area of the three dimensional model having large curvatures is split into minute voxels, while an area with negligible variations in shape is split into large voxels, thereby enabling to reduce the number of voxels.

However, in the conventional technology, the voxel data can be reduced only to a limited extent. Especially, if the technology is used for a large scale three dimensional model, a large number of three dimensional models are included in the split areas, thereby resulting in a massive amount of voxel data.

Moreover, when the voxel data is large in scale, it is time consuming to perform data processing (such as a plotting processing, a shape expanding processing, or an edge extraction processing) on such voxel data.

SUMMARY OF THE INVENTION

It is an object of the present invention to at least solve the problems in the conventional technology.

According to an aspect of the present invention, a three-dimensional data controller for controlling voxel data by distributing the voxel data to hierarchical nodes includes a storing unit that stores combination patterns, each of the combination patterns representing combinations of model statuses of lower nodes towards an upper node of the hierarchical nodes, and a converting unit that converts, based on the combination patterns stored in the storing unit, the voxel data into voxel-pattern-data.

According to another aspect of the present invention, a three-dimensional data processor that performs data processing on voxel data distributed to hierarchical nodes includes an extracting unit that extracts from the voxel data combination patterns actually included in the hierarchical nodes, each of the combination patterns representing combinations of model statuses of lower nodes towards an upper node of the hierarchical nodes, a storing unit that stores the combination patterns extracted by the extracting unit, a data processing unit that performs the data processing on the combination patterns stored in the storing unit, and a generating unit that generates the voxel data reflecting the data processing performed by the data processing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 depicts data stored in a combination-pattern storing table shown in FIG. 1;

FIG. 8 depicts another example of data stored in the combination-pattern storing table;

DETAILED DESCRIPTION OF THE PREFERRED EMBODIMENTS

Exemplary embodiments of the present invention will be described below with reference to accompanying drawings. The present invention is not limited to these embodiments.

Figure 1:
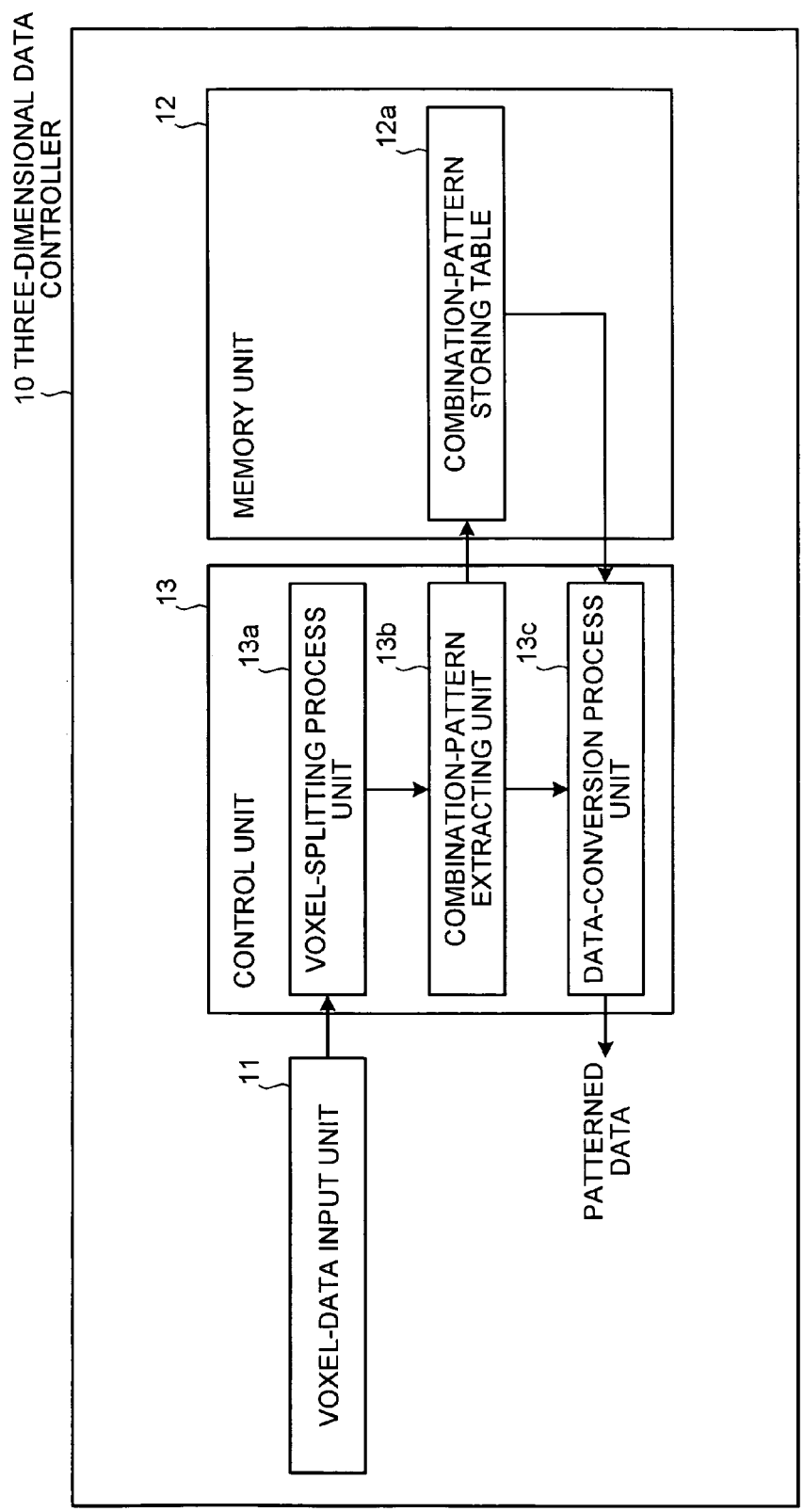
FIG. 1 is a is a block diagram of a three-dimensional data controller according to an embodiment of the present invention.

FIG. 1 is a block diagram of a three-dimensional data controller 10 according to an embodiment of the present invention. The three-dimensional data controller 10 controls voxel data by distributing the voxel data to hierarchical nodes. The voxel data is generated by subjecting three dimensional data to a voxel splitting process. Examples of the three dimensional data include a three-dimensional polygon model created by means of three dimensional CAD, finite element data that is output by using an analysis simulator, three dimensional volume data that is measured in a CT scan.

Figure 2:
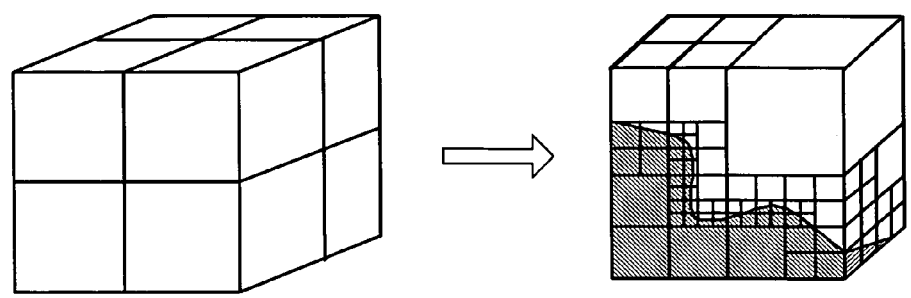
FIG. 2 depicts a voxel splitting process.

To be specific, in the three-dimensional data controller 10, the entire space of the three dimensional data is treated as a root node, and the root node is split into eight hierarchical nodes (see FIG. 2). If a three dimensional model is included in a split area, the three-dimensional data controller 10 carries out a voxel splitting process to further split the split area into eight parts. The voxel splitting process is recursively carried out until a three dimensional model is not included in the split area, or only a surface part of the three dimensional model is included in the split area, or the voxel data is split into hierarchies of predetermined depth (see FIG. 3).

Figure 3:
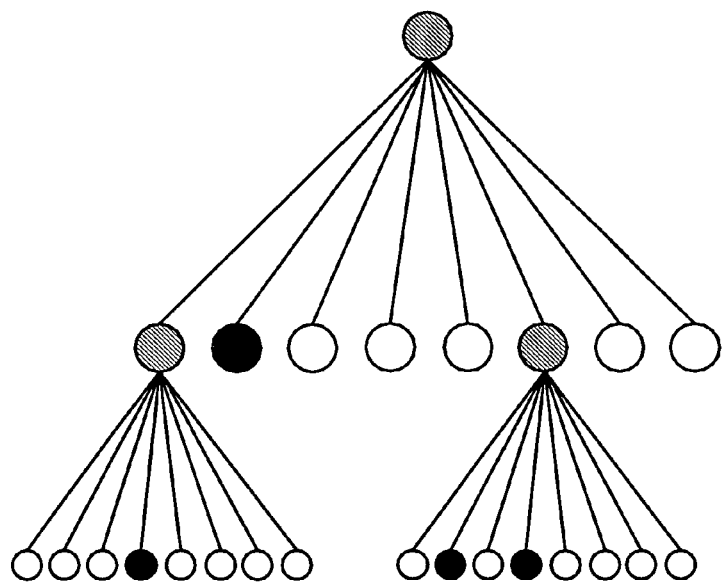
FIG. 3 depicts a hierarchical structure that is split into eight nodes.

As shown in FIG. 3, the three-dimensional data controller 10 attaches a model status (white node, black node, or gray node) to each node corresponding to a split area. A model status of white node indicates that a three dimensional model is not included in the split area, a model status of black node indicates that only a surface part of a three dimensional model is included in the split area, and a model status of gray node indicates that a three dimensional model is included in the split area.

In the three-dimensional data controller 10, combinations of model statuses of lower nodes towards an upper node are stored as combination patterns, and based on the combination patterns, the voxel data is converted into voxel data that includes pattern data (voxel-pattern-data) using a data conversion process. This data conversion process enables the three-dimensional data controller 10 to effectively reduce the voxel data.

The combinations of model status of the lower nodes towards the upper nodes are applicable to combination patterns of a single hierarchy consisting of a parent node and a child node and including the three types of model statuses indicated by the white node, the black node, and the gray node. All the eight nodes include similar combinations of model statuses. In other words, the total number of combination patterns that are possibly included in the three dimensional model is equivalent to $3^8$. However, in an actual model such as a machine product, a large number of specific shapes such as a plain surface, a cylindrical surface, a square corner etc. are used, and therefore, the actual number of combination patterns is limited to a few dozens.

Even in the case of combination patterns that extend to a double hierarchy or more, a large number of voxels have the same combination patterns. Thus, if voxel clusters having the same combination patterns are converted into pattern data, the voxel data can be greatly reduced.

Accordingly, in the three-dimensional data controller 10, combinations of the model statuses of the child nodes towards the parent nodes are stored as combination patterns of single hierarchies, so as to convert the voxel clusters having the same combination patterns into pattern data. For example, combinations of the model statuses in the eight nodes, in other words, a total of $3^8$ combinations are stored in the form of combination patterns of the parent node and the child node in the three-dimensional data controller 10. Thus, the three-dimensional data controller 10 stores the combination patterns, which are included in the voxel data split into the eight nodes.

Further, the three-dimensional data controller 10 stores a model status of a child node and a grandchild node towards a grandparent node as a combination pattern of a double hierarchy. For example, because each of the eight child nodes of a grandparent node includes white nodes, black nodes, and N number of gray nodes, a total of $(N+2)^8$ combinations are stored as combination patterns of double hierarchies in the three-dimensional data controller 10. Thus, the three-dimensional data controller 10 stores the combination patterns of double hierarchies, which are included in the voxel data split into the eight nodes.

Based on the combination patterns, the three-dimensional data controller 10 converts the voxel data split into the eight nodes, which is subjected to the voxel splitting process, into voxel data that includes pattern data (voxel-pattern-data). To be specific, among the nodes (grandparent nodes or parent nodes) that include the same combination patterns of single hierarchies or double hierarchies, one node is treated as a "patterned node" of the combination pattern, and the other nodes are only provided with pointers to the patterned node. Accordingly, node data can be shared among the nodes having the same combination patterns.

Referring back to FIG. 1, the three-dimensional data controller 10 includes a voxel-data input unit 11, a memory unit 12, and a control unit 13.

The voxel-data input unit 11 converts three dimensional data into voxel data, and inputs the voxel data into a voxel-splitting process unit 13a. To be specific, the voxel-data input unit 11 converts the three dimensional data into voxel data of minimum size in a user specified area, and inputs the converted voxel data into the voxel-splitting process unit 13a.

The memory unit 12 stores data and programs that are required for various processes carried out by the control unit 13. The memory unit 12 is provided with a combination-pattern storing table 12a that stores combinations of model statuses of the lower nodes towards the upper nodes as combination patterns.

The combination-pattern storing table 12a stores the combination patterns (combination patterns of single hierarchies and double hierarchies) that are extracted by a combination-pattern extracting unit 13b from the hierarchical nodes of the voxel data split into eight nodes. For example, as shown in FIG. 7, the combination-pattern storing table 12a stores a single hierarchical combination pattern 00000000 associated with a single hierarchical sorting number 1 and a patterned node address xxxx1. Further, as shown in FIG. 8, the combination-pattern storing table 12a stores a double hierarchical combination pattern "LLLLLLL1" associated with a double hierarchical sorting number 1 and a patterned node address xxx1x.

The control unit 13 includes a control program such as an operating system (OS), specific programs such as sequences of various processes, and an internal memory for storing the necessary data. The control unit 13 executes various processes using the control program, the specific programs, and the internal memory. The control unit 13 includes the voxel-splitting process unit 13a, the combination-pattern extracting unit 13b, and a data-conversion process unit 13c.

As described above with reference to FIGS. 2 and 3, the voxel-splitting process unit 13a computes and splits into eight nodes the voxel data that is input from the voxel-data input unit 11, by performing the voxel splitting process.

Further, as shown in FIG. 3, the voxel-splitting process unit 13a attaches a model status (white node, black node, or gray node) to each node corresponding to the split area. The voxel-splitting process unit 13a can also directly create the voxel data that is split into eight nodes from the three dimensional data.

The combination-pattern extracting unit 13b extracts combination patterns actually included in the hierarchical nodes of the voxel data split into eight nodes, and inputs the extracted combination patterns into the combination-pattern storing table 12a.

Specifically, upon input of the voxel data split into eight nodes by the voxel-splitting process unit 13a, the combination-pattern extracting unit 13b extracts the parent nodes from all the nodes and computes pattern numbers of combination patterns of model statuses of the child nodes towards the extracted parent nodes.

Figure 4:
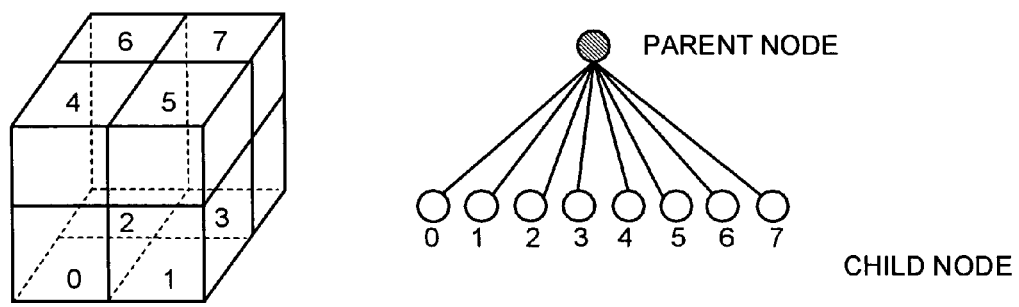
FIG. 4 depicts a relation between a parent node and child nodes.
Figure 5:
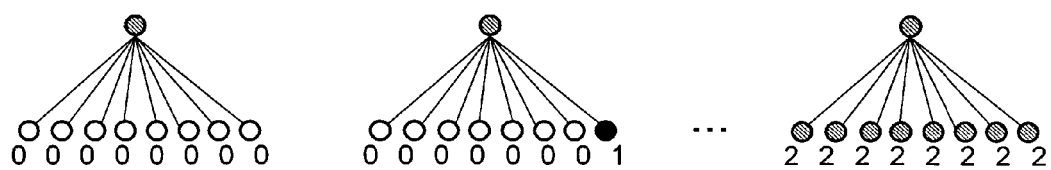
FIG. 5 depicts combination patterns.

For example, if eight child nodes are positioned in an area with positional relations as shown in FIG. 4, and a white node, a black node, and a gray node are represented by "0", "1", and "2", respectively, the pattern numbers of the combination patterns of the parent nodes are computed as "00000000", "00000001", ..., "22222222" and so on, as shown in FIG. 5.

Figure 6:
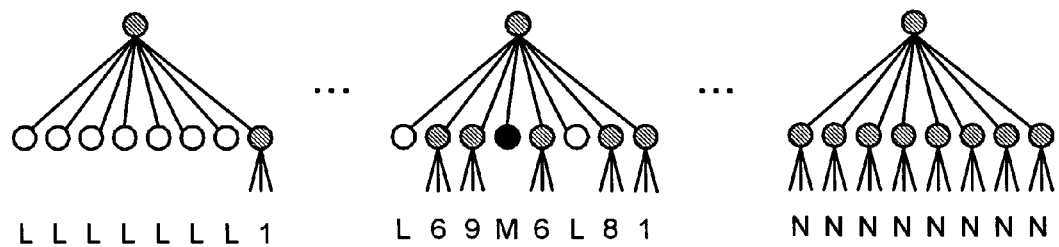
FIG. 6 depicts another example of combination patterns.

Next, the combination-pattern extracting unit 13b sorts the pattern numbers of the parent nodes thus computed and attaches a sorting number in the sorted sequence. In other words, as shown in FIG. 6, the discontinuous pattern numbers are converted into serial "sorting numbers".

Next, the combination-pattern extracting unit 13b extracts the grandparent nodes from all the nodes and computes the pattern numbers of combination patterns of model status of the child nodes and the grandchild nodes towards the extracted grandparent nodes. The combination-pattern extracting unit 13b then sorts the pattern numbers of the grandparent nodes.

For example, for representing a combination of a model status of the child node and the grandchild node towards the grandparent node, if the child node is a gray node, the child node is represented by using the sorting number of the single hierarchy. If the child node is a white node, the child node is represented by a sorting number L (L=N+1) that is greater than N. If the child node is a black node, the child node is represented by a sorting number M (=N+2) that is greater than M. Thus, as shown in FIG. 6, the pattern numbers of the combination patterns of the grandparent nodes are computed as "LLLLLLLL", ..., "L69M6L81", ..., "NNNNNNNN" and so on.

Next, the combination-pattern extracting unit 13b extracts the upper nodes (parent nodes or grandparent nodes) with the same sorting numbers for the respective parent nodes and grandparent nodes, and records one upper node from the extracted upper nodes in the combination-pattern storing table 12a as the patterned node (see FIG. 7 and FIG. 8).

Thus, the combination-pattern extracting unit 13b extracts the combination patterns actually included in the hierarchical nodes of the voxel data split into eight nodes, and inputs the extracted combination patterns into the combination-pattern storing table 12a, thereby enabling to convert the voxel clusters having the same combination patterns into pattern data without error.

Based on the combination patterns that are stored in the combination-pattern storing table 12a, the data-conversion process unit 13c converts the voxel data split into eight nodes, into the voxel data split into eight patterned nodes that include pattern data (voxel-pattern-data). To be specific, among the nodes (grandparent nodes or parent nodes) that include the same combination patterns of single hierarchies or double hierarchies, one node is selected as the patterned node of the combination pattern, and the other nodes are only provided with pointers to the patterned node, thereby converting the voxel data split into eight nodes into voxel data split into eight patterned nodes that include pattern data.

Figure 9:
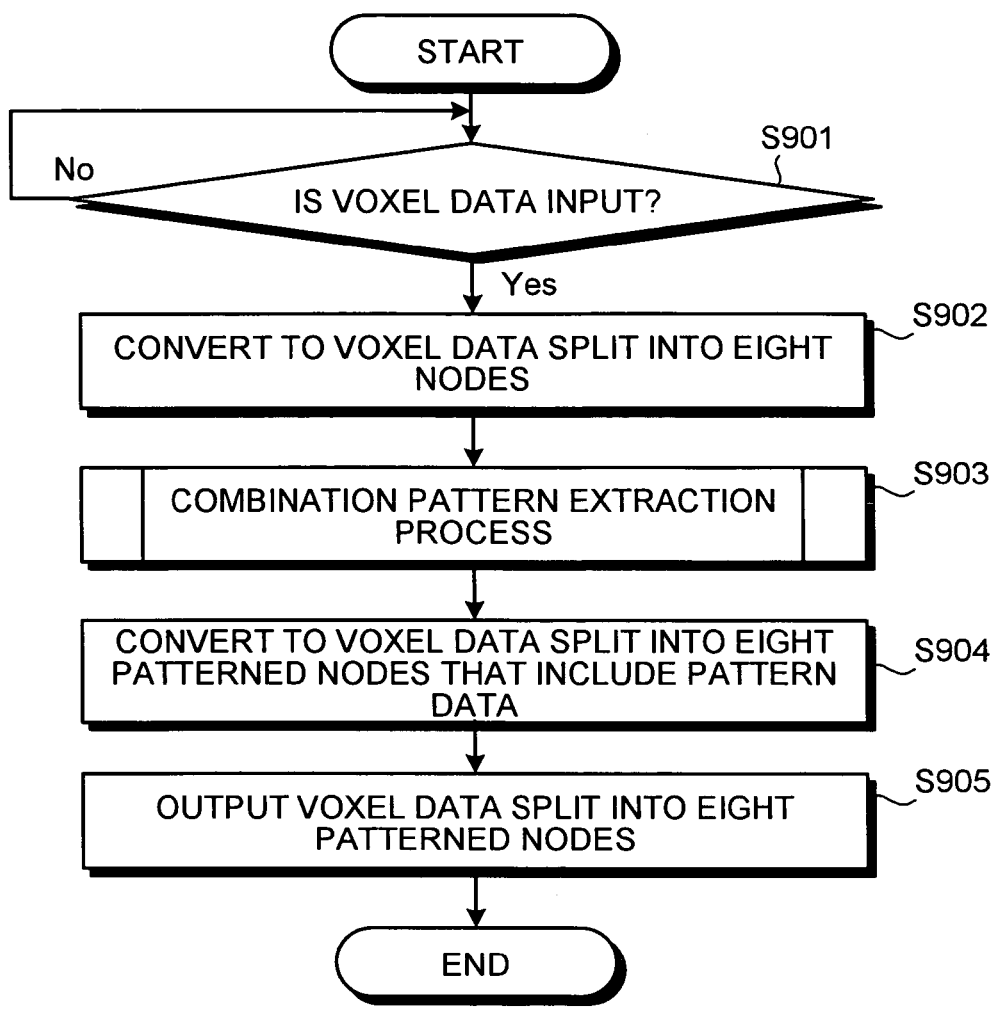
FIG. 9 is a flow chart of a sequence of a data conversion process.

FIG. 9 is a flow chart of the data conversion process. Upon input of the voxel data by the voxel-data input unit 11 ("Yes" at step S901), the voxel-splitting process unit 13a carries out the voxel splitting process to convert the voxel data into the voxel data split into eight nodes (step S902).

The combination-pattern extracting unit 13b extracts combination patterns actually included in the hierarchical nodes of the voxel data split into eight nodes by the voxel-splitting process unit 13a, and inputs the combination patterns into the combination-pattern storing table 12a (step S903).

Figure 10:
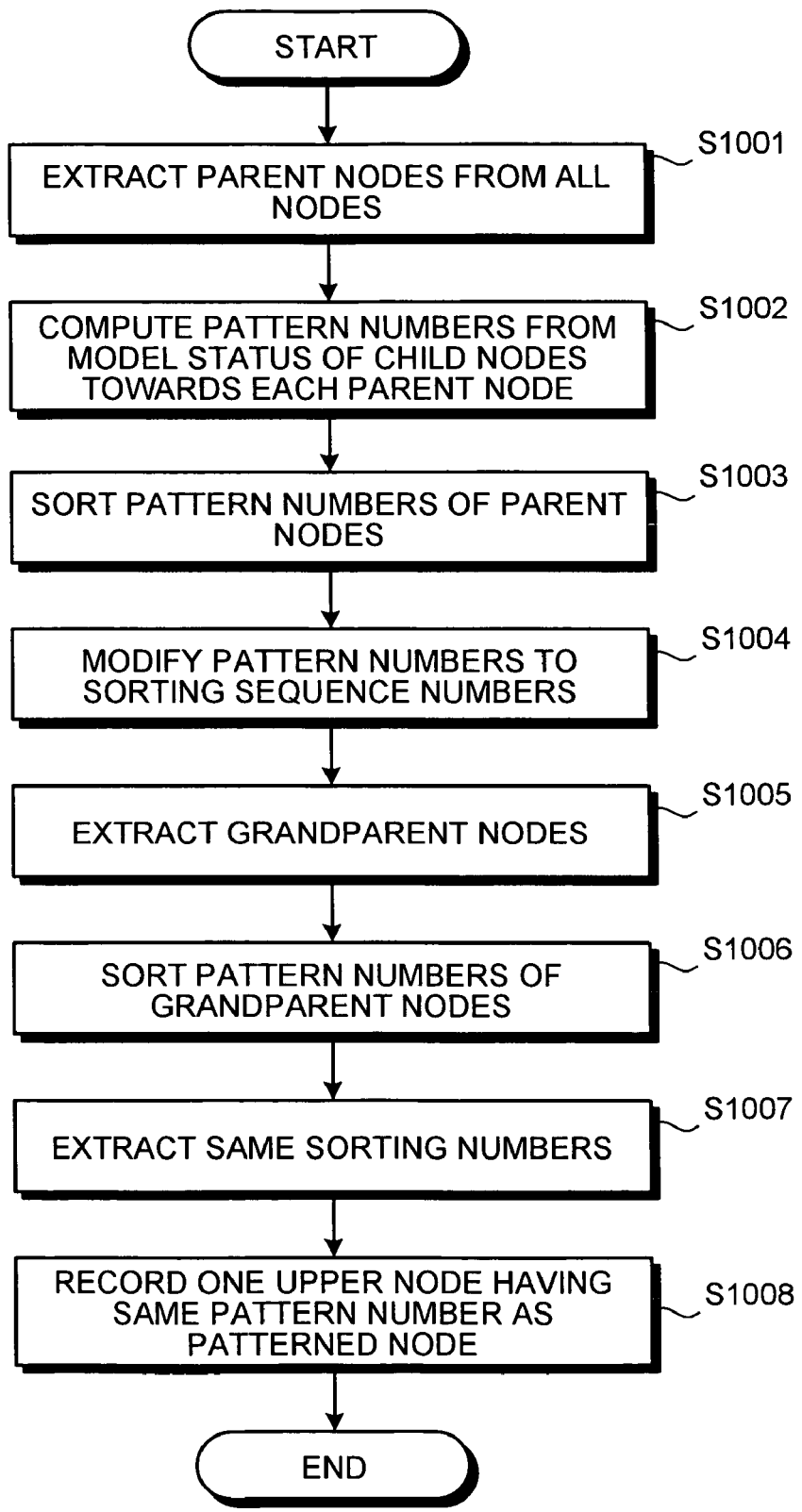
FIG. 10 is a flow chart of a sequence of a combination-pattern extraction process.

The combination pattern extraction process performed at step S903 is explained in detail with reference to FIG. 10. The combination pattern extraction process starts upon input of the voxel data split into eight nodes by the voxel-splitting process unit 13a (after completion of step S902).

The combination-pattern extracting unit 13b extracts the parent nodes from all the nodes (step S1001) and computes the pattern numbers of the combination patterns of model statuses of the child nodes towards the parent nodes (step S1002).

The combination-pattern extracting unit 13b sorts the computed pattern numbers of the parent nodes (step S1003), and attaches a sorting number in the sorted sequence (step S1004).

The combination-pattern extracting unit 13b extracts the grandparent nodes from all the nodes (step S1005), computes the pattern numbers of the combination patterns of model statuses of the child nodes and the grandchild nodes towards the extracted grandparent nodes, and sorts the pattern numbers of the grandparent nodes (step S1006).

The combination-pattern extracting unit 13b extracts the upper nodes (parent nodes or grandparent nodes) having the same sorting numbers (step S1007), and records one upper node from the extracted upper nodes in the combination-pattern storing table 12a as a patterned node (step S1008).

Referring back to FIG. 9, based on the combination patterns that are stored in the combination-pattern storing table 12a, the data-conversion process unit 13c converts the voxel data split into eight nodes, into the voxel data split into eight patterned nodes that include pattern data (voxel-pattern-data) (step S904), and outputs the converted voxel data split into eight patterned nodes to a desired device (step S905).

Thus, in the three-dimensional data controller 10, combinations of model statuses of the lower nodes towards the upper nodes are stored as combination patterns, and based on the combination patterns, the voxel data is converted into voxel data that includes pattern data (voxel-pattern-data), thereby enabling to share node data among the nodes having the same combination pattern, and effectively reduce the voxel data.

In the embodiment, the data conversion process is performed based on the combination patterns of single hierarchies and double hierarchies in the form of combinations of model statuses of the lower nodes towards the upper nodes. However, the present invention can be similarly applied to a three-dimensional data controller in which combination patterns of a random hierarchy are stored singularly or in multiple layers in the combination-pattern storing table 12a.

In the embodiment, the combination-pattern extracting unit 13b extracts combination patterns actually included in the hierarchical nodes of the voxel data split into eight nodes, and inputs the extracted combination patterns into the combination-pattern storing table 12a. However, the present invention can be similarly applied to a three-dimensional data controller in which all the combinations of model statuses of the lower nodes towards the upper nodes in a hierarchy of a predetermined depth are stored as combination patterns. This enables to convert the voxel clusters having the same combination patterns into pattern data without the necessity to carry out a specific process beforehand.

The present invention can also be applied to extract combinations of model statuses of the lower nodes towards the upper nodes as combination patterns actually included the voxel data into the combination-pattern storing table 12a, carry out a desired data processing (data processing unit) on the combination patterns stored in the combination-pattern storing table 12a, and generate voxel data that reflects the results of the data processing on the combination patters (generating unit).

In other words, when carrying out localized processings such as a plotting processing, a shape expanding processing, or an edge extraction processing on the three dimensional data, instead of carrying out the processings in various patterned areas, the processings can be carried out in a single area and the result of the processings can be diverted to other areas, thereby enabling to eliminate repetition of processings and enhance the speed of data processings on the voxel data.

For example, triangular polygons need to be constructed inside voxels in the plotting process. When constructing the triangular polygons in areas having the same pattern, a polygonal shape can be computed in a single split area and the computed polygonal shape can be moved and converted for use in other areas. Conversion patterns such as rotation or mirror image inversion can also be used.

In the present invention, if a combination pattern is converted, by rotating or inverting the combination pattern, into the same combination pattern as another combination pattern, conversion attributes of rotation or inversion or both can also be further extracted into the combination-pattern storing table 12a.

For example, for every parent node, converted patterns (converted by rotation or inversion or both) of a basic pattern is matched with the basic pattern (combination pattern actually included in the voxel data), and the number of the basic pattern that matches that of the converted patterns is used as the pattern number. Moreover, the conversion attributes (for example, numerical data such as rotation around Z axis through 90 degrees etc.) also need to be added to the pointers to the patterned node as node data of the same combination patterns.

In other words, this enables to increase the number of voxels that include the same combination patterns, and simultaneously reduce the number of combination patterns, thereby enabling to reduce the voxel data more effectively. Moreover, reduction of combination patterns also enhances the speed of various processings that are carried out on the voxel data.

All the automatic processes explained in the embodiment can be, entirely or in part, carried out manually. Similarly, all the manual processes explained in the present embodiment can be entirely or in part carried out automatically by a known method. The sequence of controls, specific names, and data including various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used. The process functions performed by the apparatus are entirely or partially realized by the CPU or a program executed by the CPU or by a hardware using wired logic.

According to the present invention, node data can be shared among nodes having the same combination pattern and voxel data can be effectively reduced.

Furthermore, according to the present invention, voxel clusters having the same combination patterns can be converted into pattern data without the necessity to carry out a specific process beforehand.

Moreover, according to the present invention, voxel clusters having the same combination patterns can be converted into pattern data without error.

Furthermore, according to the present invention, the number of voxels having the same combination patterns can be increased and the number of combination patterns can be reduced simultaneously, thus enabling to reduce the voxel data more effectively, and to enhance the speed of various processings that are carried out on the voxel data.

Moreover, according to the present invention, repetition of processings on the voxel data can be eliminated so as to enhance the speed of processings carried out on the voxel data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A three-dimensional data controller for controlling voxel data by distributing the voxel data to hierarchical nodes, comprising:
    a storing unit that stores combination patterns, each of the combination patterns representing combinations of model statuses of lower nodes towards an upper node of the hierarchical nodes; and
    a converting unit that converts based on the combination patterns stored in the storing unit, the voxel data into voxel-pattern-data, wherein among nodes that include same combination patterns as a first hierarchy or a second hierarchy, the converting unit converts the voxel data into the voxel-pattern-data by selecting one node as a patterned node of a combination pattern and providing other nodes with pointers to the patterned node.

2. The three-dimensional data controller according to claim 1, wherein the storing unit stores the combination patterns of the hierarchical nodes for a predetermined depth of hierarchy.

3. The three-dimensional data controller according to claim 1, further comprising an extracting unit that extracts from the voxel data the combination patterns actually included in the hierarchical nodes.

4. The three-dimensional data controller according to claim 3, wherein the extracting unit further extracts from the voxel data a conversion attribute representing rotation/inversion of a first conversion pattern among the combination patterns, when the first conversion pattern is converted by rotation/inversion into a same combination pattern as another combination pattern among the combination patterns.

5. A three-dimensional data processor that performs data processing on voxel data distributed to hierarchical nodes, comprising:
    an extracting unit that extracts from the voxel data combination patterns actually included in the hierarchical nodes, wherein each of the combination patterns represents a combination of model statuses of nodes which belong to an upper node except a root node which represents an entire space;
    a storing unit that stores the combination patterns extracted by the extracting unit;
    a data processing unit that performs the data processing on the combination patterns stored in the storing unit, the data processing includes a plotting processing, a shape expanding processing, or an edge extraction processing on the combination patterns; and a generating unit that generates the voxel data reflecting the data processing performed by the data processing unit.

6. A method of controlling voxel data by distributing the voxel data to hierarchical nodes, comprising:

using a computer processor to execute operations of:

storing combination patterns, each combination pattern representing combinations of model statuses of lower nodes towards an upper node of the hierarchical nodes; and converting based on the stored combination patterns, the voxel data into voxel-pattern-data, wherein among nodes that include same stored combination patterns as a first hierarchy or a second hierarchy, the converting includes converting the voxel data into the voxel-pattern-data by selecting one node as a patterned node of a combination pattern and providing other nodes with pointers to the patterned node.

* * * * *